United States Patent [19]
Hoff et al.

[11] 4,376,064
[45] Mar. 8, 1983

[54] CATALYST AND PROCESS FOR PRODUCTION OF POLYOLEFINS OF IMPROVED MORPHOLOGY

[75] Inventors: Glen R. Hoff, Naperville, Ill.; Peter Fotis, Reading, Pa.

[73] Assignee: Standard Oil Co. (Indiana), Chicago, Ill.

[21] Appl. No.: 267,515

[22] Filed: May 26, 1981

[51] Int. Cl.³ .............................................. C08F 4/64
[52] U.S. Cl. .............................. 252/429 B; 526/114; 526/115; 526/125; 526/122; 526/127; 526/137; 526/139; 526/138
[58] Field of Search ..................................... 252/429 B

[56] References Cited

U.S. PATENT DOCUMENTS

| | | | |
|---|---|---|---|
| 3,186,977 | 6/1965 | Coover et al. | 260/93.7 |
| 3,216,987 | 11/1965 | Price | 260/93.7 |
| 3,278,643 | 10/1966 | Achon | 260/88.2 |
| 3,377,326 | 4/1968 | Loveless et al. | 260/80.78 |
| 3,639,375 | 2/1972 | Staiger et al. | 260/93.7 |
| 3,644,318 | 2/1972 | Diedrich et al. | 260/88.2 |
| 3,644,320 | 2/1972 | Suguira et al. | 260/93.7 |
| 3,770,839 | 11/1973 | Matsushima | 252/429 B X |
| 3,787,384 | 1/1974 | Stevens et al. | 260/94.9 |
| 3,901,863 | 8/1975 | Berger et al. | 260/88.2 |
| 3,926,928 | 12/1978 | Karayannis et al. | 260/88.2 |
| 3,953,414 | 4/1976 | Galli et al. | 526/348 |
| 4,013,823 | 3/1977 | Longi et al. | 252/429 B X |
| 4,039,472 | 8/1977 | Hoff | 252/429 C |
| 4,104,199 | 8/1978 | Hoff | 252/430 |
| 4,111,835 | 9/1978 | Foschini | 252/429 C |
| 4,130,503 | 12/1978 | Fodor | 252/429 B |
| 4,130,699 | 8/1978 | Hoff et al. | 526/67 |
| 4,186,107 | 1/1980 | Wagner | 252/429 B |
| 4,190,614 | 2/1980 | Ito et al. | 525/106 |
| 4,199,476 | 4/1980 | Melquist et al. | 252/431 R |
| 4,222,895 | 9/1980 | Allan et al. | 252/429 B |
| 4,224,181 | 9/1980 | Lancer | 252/429 B |
| 4,233,182 | 11/1980 | Hoff et al. | 252/429 C |
| 4,234,710 | 11/1980 | Moberly et al. | 252/429 B X |
| 4,258,168 | 3/1981 | Karayannis et al. | 526/139 |
| 4,260,708 | 4/1981 | Fodor | 526/125 |

FOREIGN PATENT DOCUMENTS 5639 11/1979 European Pat. Off. .
52-100595 2/1976 Japan .

Primary Examiner—Patrick Garvin
Attorney, Agent, or Firm—Stephen L. Hensley; William T. McClain; William H. Magidson

[57] ABSTRACT

Catalyst for production of polyolefins of improved morphology comprises (A) organometallic promoter and (B) product obtained by contacting (1) at least one oxygenated compound of phosphorus with (2) catalytic complex comprising an intimate association of at least one reduced Group IVB–VB metal halide, at least one divalent metal halide and at least one aluminum compound. Oxygenated phosphorus compound is used in an amount effective to improve polymer morphology without substantial adverse effects on other catalytic properties.

11 Claims, No Drawings

CATALYST AND PROCESS FOR PRODUCTION OF POLYOLEFINS OF IMPROVED MORPHOLOGY

BACKGROUND OF THE INVENTION

This invention relates to improved catalysts for polymerization of alpha-olefins, and more particularly, to catalysts for polymerization of alpha-olefins to products of improved morphology.

It is well known to polymerize alpha-olefins in the presence of catalysts generally comprising an organometallic promoter and a supported catalytic complex comprising an intimate association of reduced Group IVB and/or VB metal halides, divalent metal halides and one or more aluminum compounds. Such complexes typically are prepared by reaction of one or more higher valent Group IVB or VB metal compounds, support materials comprising at least one catalytically inert divalent metal compound, and organoaluminum compounds corresponding to the formula $AlR_nX_{3-n}$, wherein R is hydrocarbyl, X is halogen and $0 < n \leq 3$. Examples of such catalyst components are described in detail in U.S. Pat. No. 3,644,318 (Diedrich et al.), U.S. Pat. No. 3,901,863 (Berger et al.), U.S. Pat. No. 4,199,476 (Melquist et al.) and U.S. Pat. No. 4,233,182 (Hoff et al.), all of which are incorporated herein by reference.

The above-described catalysts typically exhibit sufficiently high activities in polymerization of alpha-olefins that useful products can be obtained without removal of catalyst residues. This, of course, leads to important advantages in terms of process efficiency. However, catalyst performance is not entirely satisfactory from the standpoint of polymer morphology.

While not wishing to be bound by theory, it has been speculated that the small particle size of the supported catalyst complex and/or the tendency of the complex to fragment during polymerization use, e.g., during pumping of catalyst component and/or due to the exothermic polymerization reaction itself, result in relatively high levels of small polymer particles and a relatively broad distribution of polymer particle sizes.

Whatever the cause, production of small polymer particles and polymer of broad particle size distribution is disadvantageous for several reasons. From the standpoint of polymerization process efficiency, high levels of small polymer particles can cause problems because the particles tend to accumulate in, and plug, process lines and filters. From the standpoint of handling and processing of polyolefins, small polymer particles and broad particle size distribution can be disadvantageous because polymer bulk density often is lower than desired and an extrusion and/or pelletization step often is required prior to processing.

In the past, various means for improving polymer morphology have been proposed. One approach has been to prepare supported catalyst complexes using support materials which, due to their size, shape and/or chemical composition, yield complexes that are improved in terms of morphology. See, for example, U.S. Pat. No. 3,787,384 (Stevens et al.)—supported catalyst complexes prepared from silica, alumina or silica-alumina support materials having particle size ranging from 10 to 500 microns; U.S. Pat. No. 3,953,414 (Galli et al.)—spherical or spheroidal supported catalyst complex prepared from hydrated magnesium chloride which has been melted and sprayed into a current of hot nitrogen or air through nozzles having orifices of appropriate diameter; U.S. Pat. No. 4,111,835 (Foschini)—supported catalyst complexes prepared from hydrated Mg chloride in the form of spheroidal particles of 10 to 70 microns; U.S. Pat. No. 4,104,199 (Hoff)—supported catalyst complexes prepared from hydrated Mg stannate support materials; and U.S. Pat. No. 4,233,182 (Hoff et al.)—supported catalyst complexes prepared from support materials which are divalent metal salts of phosphorus acid esters.

A second approach has been to pretreat supported catalyst complexes with minor amounts of alpha-olefins to form encapsulted particles of greater size and resistance to fragmentation. See, for example, U.S. Pat. No. 4,190,614 (Ito et al.).

A third method for improving supported catalyst complexes in terms of polymer morphology involves the use of modifying compounds. Thus, U.S. Pat. No. 4,039,472 (Hoff) discloses treatment of complexes of the type described in the aforesaid U.S. Pat. Nos. 3,644,318 and 3,901,863 with anhydrous HCl to improve polymer morphology. Anhydrous HCl also can be used for purposes of temporary and reversible deactivation of supported catalytic complexes as taught in U.S. Pat. No. 4,130,699 (Hoff et al.).

Among the foregoing methods, the first is somewhat limited in terms of the number of materials that will yield the desired effect as a result of chemical composition and by the cost and complexity of obtaining support material particles of specific shapes and/or sizes. Similarly, alpha-olefin pretreatment is disadvantageous because it can add cost to the overall polymerization process. In addition, encapsulated catalyst complex particles resulting from pretreatment often are more difficult to convey and feed to a reactor than untreated particles.

The use of modifying compounds to improve supported catalyst complexes in terms of polymer morphology is potentially a simple and inexpensive method assuming the existence of effective and easy-to-use modifiers that do not adversely affect catalyst performance, e.g., activity, polymer rheology, to a substantial degree. Anhydrous HCl meets these criteria for the most part though its use is complicated somewhat because it is used as a gas, and accordingly, difficulties may be encountered in metering the precise amounts necessary to attain desirable improvements in morphology while avoiding undesirable agglomeration of particles or other undesirable effects.

From the foregoing, it can be appreciated that there remains a need for improvements in the above-described supported catalyst complexes in terms of polymer morphology. It is an object of this invention to provide such improvements. A further object is to provide supported catalyst components that are improved in terms of polymer morphology with only minor decreases, or in some cases, increases, in catalytic activity. A further object of the invention is to provide an improved alpha-olefin polymerization catalyst component and catalyst based thereon, as well as a method for production thereof and for use in polymerization of alpha-olefins. Other objects of the invention will be apparent to persons skilled in the art from the following description and the appended claims.

We have now found that the objects of this invention can be attained by modification of the above-described supported catalyst complexes with appropriate amounts of oxygenated compounds of phosphorus. Advantageously, the modification procedure is simple and does not add substantial cost to the overall polymerization process. Further, as a result of the modification, catalyst complexes are improved in terms of polymer morphology without substantial adverse effects on other properties. In particular, particle size is increased and particle size distribution narrows such that process efficiency is improved and polymer processing and handling are facilitated. Further, in some cases, these desirable results are accompanied by increases in catalyst activity.

In the past, various phosphorus compounds have been proposed for use in polymerization of olefins, albeit for purposes unrelated to morphology improvement, and such proposals may be of interest with respect to the present invention. These are discussed hereinbelow.

U.S. Pat. No. 3,186,977 (Coover, Jr. et al.) discloses polymerization of propylene and higher olefins, mixtures thereof and mixtures with ethylene in the presence of catalysts comprising a trihydrocarbylaluminum, a titanium or vanadium halide and a phosphorus compound corresponding to the formula $P(O)Y_3$ or $PY_3$ wherein Y is alkylamino or alkoxy of 1 to 8 carbons. According to the patentee, use of such a catalyst, particularly in propylene polymerization, gives products of increased inherent viscosity and molecular weight and substantially higher crystallinity.

U.S. Pat. No. 3,216,987 (Price) discloses polymerization of $C_{2-20}$ alpha-olefins in the presence of titanium trichloride, alkylaluminum dihalide or sesquihalide and alkyl- or aralkylphosphonates. The phosphonate component and the alkylaluminum component are combined prior to addition of the titanium trichloride. Price discloses that polymerization in the presence of such catalysts gives polymer of improved crystallinity.

U.S. Pat. No. 3,278,643 (Achon) discloses that addition of an organophosphate, organothiophosphate, organophosphonate, organophosphine or organophosphine oxide to a vanadium oxytrichloride-alkylaluminum dihalide gives increased activity in polymerization of mixtures of ethylene with higher olefins to substantially non-crystalline polymers.

U.S. Pat. No. 3,377,326 (Loveless et al.) discloses addition of phosphorus trihalides in combination with oxidants to a primary olefin polymerization catalyst system made up of a vanadium salt and organometallic component to increase polymerization activity, particularly in copolymerization of ethylene and propylene.

U.S. Pat. No. 3,639,375 (Staiger et al.) discloses olefin polymerization catalysts comprising a titanium(III) halide-aluminum halide complex, an amine, a phosphite of the formula $O=PR_3$ or $O=(PR_2)_2=O$ wherein each R is independently hydrogen, hydrocarbyl or hydrocarbylamino, an organoaluminum compound and, optionally, an organozinc compound. The catalyst is useful primarily in polymerization of propylene, with the amine and phosphite components serving to promote activity and/or stereospecificity.

U.S. Pat. No. 3,644,320 (Sugiura et al.) discloses addition of trithiosphosphates or trithiophosphites to titanium trihalide-organoaluminum compound catalysts to improve stereospecificity without decreasing activity in polymerization of $C_3$ or higher alpha-olefins.

U.S. Pat. No. 4,186,107 (Wagner) discloses supported catalytic complexes prepared by contacting a specially prepared magnesium halide with electron donors, including phosphines, and titanium halides. According to the patentee, an essential step in preparation of such complexes is treatment of magnesium halide particles with donor either during or after precipitation of such particles. Column 9 lines 1–12. The result is treated with an aromatic acid ester and then titanium halide, after which an optional electron donor treatment may be conducted. Column 11 lines 32–45.

U.S. Pat. No. 4,222,895 (Allan et al.) discloses heating of titanium trichloride and phosphorus oxytrichloride in the presence of methylene chloride to improve catalyst efficiency and stereospecificity.

An abstract of European No. 5639 (Stauffer Chemical) discloses the use of phosphorus halide, preferably $PCl_3$, to stabilize vanadium tetrachloride.

An abstract of Japanese No. 52-100,595 (Mitsui Toatsu) discloses catalysts prepared, in part, by grinding titanium trichloride with certain phosphorus compounds.

Unlike the proposals discussed hereinabove, the improved catalyst complexes of the present invention are prepared by contacting preformed supported complexes containing reduced titanium halides with certain phosphorus compounds. Further, the results of such contacting—improving the complex in terms of polymer morphology—are neither disclosed nor suggested in such proposals.

DESCRIPTION OF THE INVENTION

Briefly, the improved catalyst component of this invention is a product obtained by contacting a supported catalyst complex comprising an intimate association of at least one reduced Group IVB and/or VB metal halide, at least one divalent metal halide and one or more compounds of aluminum with at least one oxygenated compound of phosphorus in an amount and under conditions effective to improve polymer morphology.

In a more specific aspect, the invented catalyst component is a product obtained by contacting (A) a supported catalyst complex which is a reaction product of components comprising (1) at least one higher valent Group IVB and/or VB metal compound, (2) a support material comprising at least one divalent metal compound, and (3) at least one organo-aluminum compound corresponding to the formula $AlR_nX_{3-n}$, wherein R is hydrocarbyl, X is halogen and $0 < n \leq 3$, with (B) at least one oxygenated phosphorus compound in an amount and under conditions effective to improve polymer morphology.

In greater detail, the supported catalyst complex that is treated with oxygenated phosphorus compound according to this invention comprises an intimate association of at least one reduced Group IVB and/or VB metal halide, at least one divalent metal halide and at least one compound of aluminum. The supported complex exhibits sufficiently high olefin polymerization activity when combined with organo-metallic activator that removal of catalyst residues from the polymer is unnecessary. For example, on combination with $Al(C_2H_5)_3$, ethylene polymerization activity is at least about 10,000 grams polyethylene per gram supported complex per hour. For purposes hereof, a reduced Group IVB or VB metal halide is defined as a metal halide in which the metal has a valence less than its maximum. Depending upon the materials used in preparation of the complex and the method of preparation, the complex may contain, in addition to the aforesaid reduced metal halide, divalent metal halide and aluminum compounds, other groups such as hydroxyl, alcoholate, hydrocarbyl, carboxylate, halocarboxylate, phosphorus acid ester, inorganic oxyacid and/or carbonate.

The precise chemical structure of the supported complex is not known at present though it appears that the manner in which the constituents of the complex are associated involves more than a simple physical mixture because on combination of components used in preparing the complex, reaction takes place and changes in particle size and color are observed. Further, extensive washing with typical hydrocarbon solvents, e.g., the alkanes, does not serve to completely remove the various metal compounds present in the complex. For purposes hereof, the term "intimate association" is used to define such an association.

Preferably, the high activity supported complex comprises about 2 to about 25 wt.% divalent metal, about 4 to about 35 wt.% reduced Group IVB and/or VB metal, about 40 to about 80 wt.% halogen and about 2 to about 25 wt.% aluminum. Aluminum content depends largely on the extent of washing to which the complex is subjected. More preferably, the complex comprises about 6 to about 20 wt.% magnesium, about 7 to about 25 wt.% reduced titanium or reduced titanium in combination with reduced vanadium and/or zirconium, about 50 to about 70 wt.% chlorine and about 2 to about 15 wt.% aluminum.

The supported catalytic complex is prepared by reaction of components comprising at least one higher valent Group IVB or VB metal compound, a support material comprising at least one catalytically inert divalent metal compound and at least one organo-aluminum compound corresponding to the formula $AlR_nX_{3-n}$, wherein R is hydrocarbyl, X is halogen and $0 < n \leq 3$, in amounts and under conditions effective to yield the above-described supported catalytic complex.

In greater detail, higher valent Group IVB or VB metal components useful in preparation of the supported complex include compounds capable of being converted to reduced halides on reaction with support material and organoaluminum component. For purposes hereof, higher valent is defined as the +4 oxidation state with respect to the Group IVB metals and the +3, +4 and +5 states with respect to the Group VB metals. Such materials are well known to persons skilled in the art, a number of specific examples being found in the above-referenced patents.

From the standpoint of catalytic activity, preferred Group IVB-VB metal compounds are the titanium(IV) chlorides, alkoxides and alkoxychlorides in which the alkoxy groups contain 1 to about 8 carbon atoms. Polymeric organic titanates containing 1 to about 8 carbon atoms per organic group also give desirable results. Best results are attained with $TiCl_4$, $Ti(OC_4H_9)_4$ and mixtures thereof. From the standpoint of obtaining polyolefin products having broad molecular weight distributions, mixtures of the aforesaid titanium(IV) compounds with zirconium(IV) and/or vanadium(III), (IV) and/or (V) chlorides, alkoxides, alkoxychlorides, oxychlorides, oxyalkoxides and/or oxyalkoxychlorides are preferred.

Useful support materials are those that comprise at least one catalytically inert, divalent metal compound capable of reacting with the other preparative components to form divalent metal halides. Useful divalent metals include those of Groups IB, II, IVA, VIIB and VIII such as Cu, Mg, Ca, Zn, Cd, Si, Sn, Mn, Fe and Co. Compounds of magnesium give best results in terms of catalyst performance although compounds of manganese and iron also give desirable results. Compounds of the remaining divalent metals can be used in preparation of active supported catalytic complexes although the preferred use of such compounds is in combination with a magnesium, manganese(II) or iron(II) compound as catalyst complexes free of the latter are of limited practical value.

Useful compounds of the aforesaid metals include a wide range of materials known to persons skilled in the art. Examples include hydroxides, halides, hydroxyhalides, hydrocarbyls, alcoholates, carboxylates, halocarboxylates, oximates, inorganic oxyacid salts (e.g., phosphates, sulfates), oxides, carbonates and phosphorus acid ester salts. Such compounds preferably are substantially anhydrous although a small amount of water typically can be tolerated. Representative support materials include $Mg(OH)_2$, $MgCl_2$, $Mg(OH)Cl$, $Mg(C_2H_5)_2$,

$Mg(C_2H_5)Cl$, $Mg(OC_2H_5)_2$, $Mg(OCCH_3)_2$,

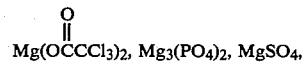
$Mg(OCCCl_3)_2$, $Mg_3(PO_4)_2$, $MgSO_4$,

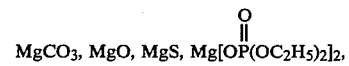
$MgCO_3$, $MgO$, $MgS$, $Mg[OP(OC_2H_5)_2]_2$,

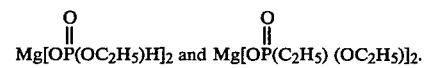
$Mg[OP(OC_2H_5)H]_2$ and $Mg[OP(C_2H_5)(OC_2H_5)]_2$.

Preferred support materials are magnesium oxide chloride, alkoxides and dialkylphosphates containing 1 to about 6 carbon atoms per alkoxy or alkyl group. Best improvements in polymer particle size are attained with respect to complexes wherein the support material is a magnesium alkoxide, particularly magnesium ethylate.

Organoaluminum compounds employed in preparation of the above-described supported catalyst complexes are materials corresponding to the formula $AlR_nX_{3-n}$, wherein R is hydrocarbyl, X is halogen, and $0 < n \leq 3$. Specific examples of such compounds are given in the above-referenced patents. Preferably, R in the formula is a $C_{1-6}$ alkyl, X is chlorine and n ranges from about 1 to about 2.5. Diethylaluminum chloride, ethylaluminum dichloride and mixtures thereof are the most preferred organoaluminum halides.

To prepare the supported catalytic complex used according to the invention, the above-described components are reacted in amounts and under conditions effective to yield a catalytic complex comprising an intimate association of reduced Group IVB and/or VB metal halide, divalent metal halide and one or more compounds of aluminum. Preferably, starting materials are used in amounts such that the atomic ratio of Group IVB and/or VB metal to divalent metal in the support material ranges from about 0.01:1 to about 100:1 and the atomic ratio of aluminum in the organoaluminum component to divalent metal ranges from about 1:1 to about 25:1. More preferably, the ratio of Group IVB and/or VB metal to divalent metal is about 0.1:1 to about 20:1 and the aluminum to divalent metal ratio is about 2:1 to about 15:1, especially about 3:1 to about 10:1. In addition, reactants and reactant concentrations should be selected such that the preparative system contains sufficient halogen to yield an active catalyst component as can be determined by persons skilled in the art from the examples appearing hereinbelow and the above-referenced patents.

The catalyst complex preparation preferably is conducted in an inert hydrocarbon or halogenated hydrocarbon solvent for one or more of the abovedescribed components at temperatures ranging from about 0° to about 200° C. and in the substantial absence of water, oxygen, carbon oxides and other extraneous catalyst poisons. The sequence of combining the components is not critical, although it is preferred to avoid contacting the Group IVB and/or VB metal component and organoaluminum halide in the absence of support material as an undesirable reduction of the Group IVB and/or VB metal may take place. The preferred sequence is to combine the Group IVB and/or VB metal component and support material in a first step and then add organoaluminum component, most preferably dissolved in a solvent, to the resulting solution or mixture. During addition of organoaluminum component it is desirable to agitate the reaction mixture to attain optimum morphological properties with respect to the catalyst complex. Preferably, agitation is sufficient to achieve complete suspension of solids present during the preparation, though not so vigorous that substantial attrition of solids takes place. Preferably, agitation is at a low enough rate that no more than about 10 wt.% of the complex has a particle size less than about 5 microns. Further details with respect to preparation of the supported complex are found in the above-referenced patents.

The result of the above-described preparation typically is a finely-divided solid that can be treated as is or suspended in a diluent or washed and/or dried prior to treatment according to the present invention. Preferably, unreacted starting materials and soluble reaction products such as excess Group IVB or VB component and organoaluminum compound are removed from the complex, e.g., by washing with a suitable solvent such as hexane, prior to treatment with oxygenated phosphorus compound.

According to the present invention, the above-described supported catalytic complex is modified by treatment with at least one oxygenated compound of phosphorus in an amount effective to improve polymer morphology without substantial adverse effects on polymerization performance.

In greater detail oxygenated phosphorus compounds employed according to this invention are those having at least one oxygen atom double-bonded to phosphorus. Included among these are the oxyacids of phosphorus, oxyhalides of phosphorus and organic and/or oxygenated organic derivatives thereof, phosphorus acid esters, halogen-substituted derivatives thereof and condensed oxygenated compounds. Mixtures also can be employed.

Examples of useful acids include hypophosphorous acid, phosphorous acid and orthophosphoric acid. Organophosphonic acids such as ethylphosphonic, diisobutylphosphonic acid benzenephosphonic acid also are suitable.

Useful oxyhalides include $POCl_3$, $POBr_3$ and $POF_3$. Organic and oxygenated organic derivatives of the oxyhalides include materials in which one or two of the halides are replaced with organic groups and/or oxygenated organic groups. Such organic groups can be of straight or branched structure, cyclic or acyclic, saturated or unsaturated and substituted or unsubstituted. Among the organic and/or oxygenated organic derivates of phosphorus oxyhalides, those containing relatively simple organic groups are preferred from the standpoint of cost and availability. Accordingly, preferred organic groups are the alkyl, aryl, alkaryl and aralkyl groups of 1 to about 20 carbon atoms.

Examples of useful derivatives of phosphorus oxyhalides include phosphonyl halides $[RP(O)X_2$ or $R_2P(O)X]$ such as methanephosphonyl dichloride, ethanephenylphosphonyl bromide, chloroethanephosphonyl dichloride, isopropanephosphonyl dichloride, cyclohexanephosphonyl dichloride, 4-bromophenylphosphonyl dichloride, 4-ethoxyphenylphosphonyl dichloride and bis(2,4,5-trimethylphenyl)phosphonyl chloride; and halophosphates $[(RO)P(O)X_2$ and $(RO)_2P(O)X]$ such as ethyl difluorophosphate, methyl dichlorophosphate, ethyl dichlorophosphate, chloroethyl dichlorophosphate, diethyl fluorophosphate, diisopropyl fluorophosphate, dicyclohexyl chlorophosphate, methyl chloroethyl chlorophosphate, 4-chlorophenyl dichlorophosphate, 4-isoamyl-2-methylphenyl dichlorophosphate and ethyl phenyl chlorophosphate.

Useful phosphorus acid esters include partial and full esters of the aforesaid acids such as phosphate esters $[(RO)P(O)(OH_2)$, $(RO)_2P(O)(OH)$ and $(RO)_3P(O)]$ phosphonate esters $[RP(O)(OR)_2$ and $RP(O)(OR)(OH)]$ mono- and diorgano phosphites $[HP(O)(OH)(OR)$ and $HP(O)(OR)_2]$ and mono- and diorgano halophosphites $[XP(O)(OH)(OR)$ and $XP(O)(OR)_2]$. As with the above-described oxyhalide derivatives, the organic groups R of the phosphorus acid esters can be straight or branched, cyclic or acyclic, saturated or unsaturated and substituted or unsubstituted. The simple alkyls, aryls, aralkyls and alkaryls of 1 to about 20 carbons are preferred.

Specific examples of useful phosphates include monomethylphosphate, diethylphosphate, triethylphosphate, mono(chloroethyl)phosphate, monoisoamylphosphate, mono(hydroxyethyl)phosphate, diisopropylphosphate, butyldiisoamylphosphate, ethylditolylphosphate and tris(trichlorovinyl)phosphate. Specific examples of the phosphonates include diethyl vinylphosphonate, dimethyl allylphosphonate, diethyl methanephosphonate, dipropyl methanephosphonate, di-p-chlorophenyl methanephosphonate, methyl ditolylphosphonate and ethyl (phenylethyl)phosphonate. Examples of the mono- and diorgano phosphites include dimethyl phosphite, di-n-hexyl phosphite, diethyl phosphite and diphenyl phosphite. Examples of the mono- and diorgano halophosphites include diphenyl bromophosphite and diethyl chlorophosphite.

Useful condensed oxygenated compounds of phosphorus are those containing recurring P-O units. Cyclic and linear polyphosphates are typical examples.

With respect to the phosphites and halophosphites discussed herein, the nomenclature of Cotton and Wilkinson, *Advanced Inorganic Chemistry*, Interscience Publishers (1966) pp. 510–11, is adopted. All other phosphorus nomenclature is in accordance with Kosolapoff, *Organophosphorus Compounds*, John Wiley & Sons, Inc. (1950) pp. 4–6.

Phosphorus compounds that are preferred according to this invention are the hydrocarbon-soluble, simple organic derivatives of the phosphorus oxyhalides as well as the hydrocarbon-soluble, simple organic, partial and full esters of phosphorus acids, as these yield beneficial results in terms of morphology, are readily available and are highly compatible with the basic catalyst preparation system. More preferably, the $C_{1-8}$ alkyl and aryl derivatives of phosphorus oxytrichloride and the $C_{1-8}$ alkyl and aryl phosphates, phosphonates and phosphites are used. Best results are attained with ethyl dichlorophosphate, triethylphosphate and diethyl phosphite.

The oxygenated phosphorus compound is employed in an amount that is effective to improve polymer morphology without substantial adverse effects on other catalytic properties such as activity and polymer rheology. The precise amount will vary somewhat depending on the particular material employed. Preferably, the phosphorus compound is employed in an amount ranging from about 0.01 to about 5 moles per mole of aluminum compounds present in the supported catalyst complex. More preferably, the amount ranges from about 0.1 to about 2 moles phosphorus compound per mole aluminum compounds in order to attain desirable improvements in polymer morphology while minimizing adverse effects on other catalytic properties. The concentration of aluminum compounds present in the complex prior to modification can be determined by routine analysis for aluminum.

Supported catalytic complex and oxygenated phosphorus compound are contacted under conditions effective to yield the desired improvement in terms of polymer morphology without substantial adverse effects on other catalytic properties. Preferably, contacting is conducted at temperatures ranging from about $-10°$ to about 140° C., and more preferably about 10° to about 80° C. Treatment time is sufficiently long to ensure thorough contacting; agglomeration of treated catalyst complex particles serving as a convenient indicator of the progress of the contacting. Preferred times range from about ½ to about 10 hours with about 1 to about 3 hours being more preferred. Contacting preferably is conducted in a hydrocarbon or halohydrocarbon medium that is inert with respect to the catalytic complex and remains in the liquid state at contacting temperatures or can be maintained in the liquid state through the use of elevated pressures. Preferred media include hexane, nonane and benzene, although a wide range of other alkanes as well as various aromatics and halogenated and hydrogenated aromatics also can be used. Specific examples of the latter include diethylbenzenes, o-dichlorobenzene, tetrahydronaphthalene and decahydronaphthalene. Preferably, the medium is purified prior to use, for example, by passage over molecular sieves or silica, and/or by contact with materials capable of scavenging impurities.

Treatment with oxygenated phosphorus compound is conducted in the substantial absence of water, oxygen, carbon oxides and other extraneous catalyst poisons. Such poisons are conveniently excluded by conducting the phosphorus compound treatment in an inert atmosphere, for example, under a nitrogen blanket.

Following contacting of the oxygenated phosphorus compound and the supported catalytic complex, the result, which is in the form of a solid having a slight tendency toward further agglomeration, preferably is separated from excess phosphorus compound, such as by decantation, filtration or centrifugation. Preferably, the solid then is washed to further remove traces of unreacted phosphorus compound which, when present in excess, can harm ultimate catalyst performance. Subsequently, the resultant solid can be used in polymerization as is or suspended in a diluent prior to such use.

For polymerization use, the oxygenated phosphorus compound-modified supported complex is combined with organometallic promoter, the latter being employed in an amount that is effective to promote the polymerization activity of the modified supported complex.

Promoters useful according to this invention include any of the materials commonly known as cocatalysts or promoters for alpha-olefin polymerization catalyst components containing compounds of the group IVB—VIB metals. Examples of such promoters include Group IA, IIA, IIB, IIIA and IVA metal hydrides and the organometallics containing at least one hydrocarbyl group bonded to metal. Preferred promoters are the metal alkyls, alkylhydrides and alkylhalides, such as alkyllithium compounds, dialkylzinc compounds, trialkylboron compounds, trialkylaluminum compounds, alkylaluminum halides and hydrides. Mixtures also can be employed.

Specific examples of useful promoters include lithium hydride, lithium-aluminum hydride, sodium borohydride, n-butyllithium, diethylzinc, di-n-propylzinc, triethylboron, triethylaluminum, triisobutylaluminum, tri-n-hexylaluminum, diethylaluminum chloride, bromide, and hydride, di-n-propylaluminum chloride, bromide, and hydride, diisobutylaluminum chloride, bromide, and hydride, triethylgallium and tetraethyllead.

Promoters that are preferred for use according to this invention are the Group IIIA metal alkyls and dialkylhydrides having 1 to about 20 carbon atoms per alkyl radical. More preferably, the promoter is a trialkylaluminum compound having 1 to about 6 carbon atoms per alkyl radical such as trimethyl-, triethyl-, tri-n-propyl-, triisobutyl-, tri-n-pentyl-, and tri-n-hexylaluminum. Most preferably, the promoter is triethylaluminum or triisobutylaluminum.

The promoter is employed in at least an amount that is effective to promote the polymerization activity of the phosphorus compound-modified supported complex. Preferably, at least about 1 part by weight of promoter is employed per part by weight of treated supported complex, although higher ratios, such a 10:1, 25:1, 100:1 or higher also are suitable and often give highly beneficial results, particularly when a portion of the promoter is employed to pretreat the polymerization medium used in processes using such a medium.

Prior to combining the treated supported catalyst complex of this invention with a promoter, it also is contemplated to temporarily and reversibly deactivate the treated complex by contacting the same with a suitable deactivating agent in accordance with U.S. Pat. No. 4,130,699 (Hoff et al.). Deactivating agents that are preferred for use with the modified supported catalyst components of this invention are hydrogen halides and lower aliphatic alcohols, with anhydrous hydrogen chloride and ethanol being most preferred.

According to the invention, the above-described catalysts are employed in known alpha-olefin polymerization processes wherein at least one polymerizable alpha-olefin is contacted with the catalyst under polymerizing conditions. Typical solution, bulk and gas phase processes are contemplated herein. Suitable alpha-olefins include ethylene, propylene, butene-1, pentene-1, 4-methylpentene-1, hexene-1 and mixtures thereof. Preferably, the invented catalysts are employed in the polymerization of ethylene or mixtures of ethylene with up to about 20 mole % of one or more higher alpha-olefins.

The conditions under which the invented catalysts are employed in the polymerization of alpha-olefins are well known to persons of skill in the art and described in detail in the patents incorporated herein by reference.

Through the use of the invented catalysts there are obtained polyolefins, having molecular weights typically ranging from about 50,000 to about 3,000,000, in sufficiently high yields, relative to the amount of catalyst employed, that useful polymeric products are obtained without the need for separation of catalyst residues. The polymers exhibit sufficiently broad molecular weight distributions as to be processable by a variety of techniques such as extrusion, mechanical melting, casting, and molding. In particle form and gas phase processes, average polymer particle size typically ranges from about 300 to about 800 microns and levels of fine particles (i.e., less than 150 microns) typically are below about 10–15 wt.%.

The following examples illustrate the present invention and are not to be construed as limiting the scope thereof.

EXAMPLE I

(A) Control Catalyst Complex

To a 300 ml flask equipped with inert gas inlet, mechanical stirrer and a pressure equalizing dropping funnel, and maintained under nitrogen were added 9.55 g polymeric tetrabutyl titanate (PTBT) obtained from Dynamit Nobel, 7.96 g (0.07 mole) magnesium ethylate (ME) and 60 ml nonane. The mixture then was heated to 150° C. and maintained at that temperature for 1½ hour during which time the ME dissolved. The solution then was allowed to cool overnight after which there was added sufficient hexane to bring the total volume to 220 ml. To the result were added 102 ml of a 3.37 M solution of ethylaluminum dichloride (EADC) in hexane while stirring. During the addition a precipitate formed. After completion of the addition of EADC solution, the result was heated with stirring and then allowed to cool. A 1.8 ml sample of the resulting suspension was syringed into a 100 ml flask under nitrogen and diluted with 50 ml hexane. Samples of the resulting slurry of catalyst complex, identified herein as IA, were used in polymerization of ethylene according to (E).

(B) Treatment with Ethyl Dichlorophosphate

Under a nitrogen blanket, the suspension remaining after removal of the sample in (A) was allowed to settle and 630 ml of clear supernatant were removed. To the result there were added 600 ml hexane. The result was stirred and there were added 75 ml of a solution prepared by dissolving 3.0 ml ethyl dichlorophosphate (EDCP) in 125 ml hexane. At this point, 12.7 ml EDCP were added to the remaining 53 ml of EDCP solution to increase the EDCP concentration. 33 ml of the new EDCP solution then were added to the stirring catalyst complex-EDCP solution mixture. Solids settled rapidly. A 4.1 ml sample of the stirred suspension was syringed into a 100 ml flask under nitrogen and diluted with 50 ml hexane. Samples of the resulting slurry of catalyst complex, identified as IB, were used in polymerization of ethylene according to (E).

(C) Treatment with Ethyl Dichlorophosphate

The suspension of EDCP-treated catalyst complex remaining after removal of the 4.1 ml sample in (B) was stirred and 18 ml of the new EDCP solution prepared in (B) were added. After stirring a 4.1 ml sample was removed and diluted with 50 ml hexane. Samples of the result, identified as IC, were used in polymerization of ethylene according to (E).

(D) Treatment with Ethyl Dichlorophosphate

Following the procedure of (C), the remaining suspension of EDCP-treated complex was treated with 10 ml of new EDCP solution from (B). A sample of the result was taken and diluted with hexane, and samples of the result, identified as ID, were used in polymerization of ethylene according to (E).

(E)

A series of ethylene polymerizations was conducted according to the following procedure. Samples of the EDCP-treated catalyst complexes prepared in (A)–(D), containing amounts of treated complex as specified in Table 1, and 80 mg triethylaluminum were stirred in about 250 ml hexane in a purged, 500 ml stainless-steel autoclave reactor. The reactor was charged with hydrogen to the pressures specified in Table 1 after which the reactor was charged with ethylene to 300 psig. During polymerization, ethylene was charged as needed to maintain a total pressure of 300 psig. Polymerization was conducted at 85° C. over a period of one hour after which the reactor was opened and the contents thereof filtered. The resulting solid white polyethylene was dried overnight (about 16 hours) at 25° C. and then weighed to determine the yield. Melt indices (MI) were determined according to ASTM D-1238 Condition E. Particle size distribution was determined by placing the entire product from each run on the top screen of a stack of full height sieves (U.S.A. Standard Testing Sieves Nos. 20, 40, 60, 80 and 100, designated 850 microns, 425 microns, 250 microns, 180 microns and 150 microns, respectively) and a pan, after which a cover was placed on the top sieve and the assembly was shaken for 10 minutes using a Tyler Portable Sieve Shaker (motor speed = 500 rpm).

In Table 1 the molar ratio of EDCP to aluminum compounds is reported for each catalyst component and polymerization conditions and results are reported for each run. Particle size distributions and average particle sizes are reported in Table 2.

TABLE 1

| RUN NO. | CATALYST COMPLEX | AMT. (mg) | EDCP/Al | $H_2$ (psig) | YIELD (g) | ACTIVITY[1] | MI (dg/min) |
|---|---|---|---|---|---|---|---|
| 1 | IA | 5.9 | 0 | 45 | 59.1 | 10 | 0.85 |
| 2 | IB | 5.1 | 0.71 | 45 | 61.3 | 12 | 0.86 |
| 3 | IC | 5.0 | 1.0 | 40 | 57.1 | 11 | 1.11 |
| 4 | ID | 4.3 | 1.2 | 45 | 42.6 | 10 | 0.83 |
| 5 | IA | 9.5 | 0 | 65 | 55.7 | 5.9 | 3.9 |
| 6 | IB | 12.7 | 0.71 | 70 | 62.1 | 4.9 | 5.8 |
| 7 | IC | 7.5 | 1.0 | 60 | 45.3 | 6.0 | 5.7 |

TABLE 1-continued

| RUN NO. | CATALYST COMPLEX | AMT. (mg) | EDCP/Al | H₂ (psig) | YIELD (g) | ACTIVITY[1] | MI (dg/min) |
|---|---|---|---|---|---|---|---|
| 8 | ID | 7.2 | 1.2 | 70 | 34.4 | 4.8 | 4.4 |

[1]Activity is reported in kilograms polyethylene per gram catalyst complex (calculated on the basis of equivalent amounts of TiCl₃ and MgCl₂) per hour.

TABLE 2

| RUN No. | WT. % RETAINED ON SIEVE ($\mu$) | | | | | | APS[1] ($\mu$) |
|---|---|---|---|---|---|---|---|
| | 850 | 425 | 250 | 180 | 150 | PAN | |
| 1 | 11.6 | 39.8 | 20.5 | 7.4 | 5.4 | 15.4 | 430 |
| 2 | 20.8 | 42.9 | 20.6 | 6.0 | 4.0 | 5.7 | 525 |
| 3 | 44.4 | 37.0 | 11.8 | 2.3 | 1.6 | 2.9 | 760 |
| 4 | 51.1 | 33.4 | 9.6 | 2.0 | 1.6 | 2.2 | 860 |
| 5 | 6.5 | 36.1 | 24.5 | 6.7 | 6.0 | 20.2 | 360 |
| 6 | 9.7 | 30.3 | 27.4 | 9.5 | 7.0 | 16.1 | 350 |
| 7 | 32.4 | 42.2 | 15.8 | 3.4 | 1.8 | 4.3 | 630 |
| 8 | 34.5 | 42.4 | 14.9 | 3.0 | 2.1 | 3.0 | 650 |

[1]APS stands for average polymer particle size.

From Table 1 it can be seen that EDCP had little effect on catalyst activity and polymer rheology. At the same time, Table 2 shows that EDCP significantly improved product morphology. Thus, in runs 1–4 conducted at 40–45 psig hydrogen, treatment with increasing amounts of EDCP led to products of steadily decreasing fines content (PAN fraction), and increasing average particle size and fraction in the commercially desirable 425$\mu$+ range. In runs 5, 7 and 8, at higher hydrogen partial pressure, similar results are seen. In run 6 the level of fines decreased slightly and average particle size and the fraction in the 425$\mu$+ range were about the same as with the control catalyst complex. This result suggests a correlation between EDCP/Al and hydrogen partial pressure in that at relatively high hydrogen partial pressure, the EDCP/Al ratio required to produce a given level of morphology improvement is greater than at lower hydrogen partial pressure.

EXAMPLE II (A) Control Catalyst Complex

To a 2 liter flask equipped as in I(A) were added 138.6 g (1.21 mole) ME, 165 ml (0.49 mole) tetrabutyl titanate (TBT) and 100 ml nonane. The mixture was heated at the reflux temperature for 2½ hours during which time the ME dissolved. The solution was cooled to 100° C. and sufficient hexane was added to bring the total volume to 1,285 ml. To a 300 ml flask equipped as in I(A) and under argon were added 65 ml of the solution and 75 ml hexane. While stirring at 250 rpm, 92 ml 3.37 M EADC in hexane were added dropwise over 90 minutes. Stirring was continued for an additional 40 minutes. A 0.8 ml sample was removed, diluted with 50 ml hexane and samples of the result, identified as IIA, were employed according to (E).

(B) Treatment with Diethylphosphate (DEP)

After removal of the 0.8 ml sample in (A), solids were allowed to settle overnight and then 147 ml of clear supernatant were replaced with 235 ml hexane. After stirring for several minutes, solids again were allowed to settle and 148 ml clear supernatant were removed. The remaining suspension was stirred at 250 rpm and 5 g diethylphosphate (Eastman Organic 5764) were added over 20 minutes followed by 30 ml hexane. Stirring was continued for 1½ hours after which a 1.1 ml sample was removed and diluted with 50 ml hexane. The result, identified as IIB, was used according to (E).

(C) Treatment with Diethylphosphate

The suspension remaining after removal of the 1.1 ml sample in (B) was stirred at 250 rpm and 5 g DEP were added over 10 minutes. Stirring was continued for another 15 minutes. 2½ hours later the suspension was stirred again and a 1.3 ml sample was removed and diluted with 50 ml hexane. Samples of the result, identified as IIC, were used according to (E).

(D) Treatment with Diethylphosphate

The suspension remaining after sampling in (C) was allowed to sit for 6 days after which a 1.3 ml sample was removed and diluted with 45 ml hexane. Samples of the result, identified as IID, were used according to (E).

(E) Ethylene Polymerization

A series of polymerization was conducted according to the procedure of I(E) except as otherwise indicated. Results are reported in Table 3.

TABLE 3

| RUN NO. | 1 | 2 | 3 | 4 | 5 | 6 | 7 |
|---|---|---|---|---|---|---|---|
| CATALYST COMPLEX | IIA | IIB | IIC | IID | IIA | IIB | IID |
| AMOUNT (mg) | 0.65 | 0.70 | 0.80 | 1.52 | 0.98 | 1.3 | 2.54 |
| DEP/Al | 0 | 0.53 | 1.0 | 1.0 | 0 | 0.53 | 1.0 |
| H₂ (psig) | 50 | 50 | 45 | 60 | 80 | 85 | 90 |
| YIELD (g) | 41.4 | 59.0 | 35.2 | 46.2 | 52.7 | 58.3 | 43.1 |
| ACTIVITY (kg/g/hr) | 64 | 81 | 44 | 30 | 54 | 45 | 17 |
| MI (dg/min) | 1.2 | 1.0 | 0.4 | 0.8 | 5.5 | 6.1 | 4.4 |
| $\frac{MF_{10}[1]}{MI}$ | 35 | * | * | 30 | 35 | * | 32 |
| CATALYST COMPLEX | IIA | IIB | IIC | IID | IIA | IIB | IID |
| WT. % RETAINED ON SIEVE ($\mu$) | | | | | | | |
| 850 | 10.2 | 12.7 | * | 13 | 5.2 | 7.9 | 11.4 |
| 425 | 26.8 | 44.9 | * | 41 | 24.0 | 25.0 | 28.7 |
| 250 | 45.0 | 34.1 | * | 43 | 53.0 | 56.1 | 53.3 |
| 180 | 5.8 | 2.2 | * | 2.0 | 4.2 | 3.1 | 4.4 |
| 150 | 5.0 | 1.6 | * | 0.4 | 3.4 | 1.7 | 1.0 |
| PAN | 7.2 | 4.5 | * | 0.9 | 10.2 | 6.1 | 1.2 |
| APS ($\mu$) | 360 | 460 | * | 450 | 350 | 370 | 370 |
| BD g/cm³[2] | 0.32 | 0.32 | 0.27 | 0.23 | * | * | * |

* These values were not determined.
[1]MF₁₀/MI is the ratio of melt index according to ASTM D-1238 Condition F to MI and serves as an indicator with respect to molecular weight distribution.
[2]BD stands for bulk density and was determined by weighing a known volume of polymer.

From the table it can be seen that fines decreased with increasing levels of diethylphosphate while average particle size increased as a result of treatment with the phosphorus compound but was relatively unaffected by the level of phosphorus compound. With the exception of run 2, activity decreased with increasing diethylphosphate, although in all runs adequate activity was retained.

EXAMPLE III

(A) Control Catalyst Complex

To a 1 liter flask equipped as in I(A) were added 63.9 g (0.56 mole) ME, 78 ml (0.23 mole) TBT and 56 ml octane and the mixture was heated at the reflux temperature for 2 hours during which time the ME dissolved. After cooling for about ½ hour, total volume was brought to 785 ml with hexane. A 370 ml portion of the result was transferred to a 1 liter round bottom flask equipped as in I(A) and, while stirring, dropwise addition of 3.37 M EADC in hexane was begun. A total of 145 ml was added over a period of 1½ hours during which time a precipitate formed and temperature ranged from 28°–41° C. The result was allowed to stand overnight and then 245 ml 3.37 M EADC solution were added dropwise with stirring over 1½ hours. Stirring was continued for an additional 25 minutes and then solids were allowed to settle for about 2 hours. 450 ml clear supernatant then were removed and replaced with an equal volume of hexane. A 1.1 ml sample was removed, diluted with 50 ml hexane, and samples thereof were used according to (E). The samples are identified as IIIA.

(B) Treatment with Triethylphosphate 150 ml of suspension from (A) were added to a 300 ml flask equipped as in I(A) after which 170 ml hexane were added. The result was stirred, solids were allowed to settle, 166 ml clear supernatant were removed and 100 ml hexane were added. At this point, the suspension was stirred and dropwise addition of a mixture of 12 ml triethylphosphate (TEP) with 15 ml hexane was begun. After ½ hour, 12 ml had been added. A 1.4 ml sample was removed and diluted with 50 ml hexane. Samples of the result, identified as IIIB, were used in polymerization in (E).

(C) Treatment with Triethylphosphate

The remaining TEP-hexane mixture from (B) was added to the suspension of catalyst complex remaining after sampling in (B). At the end of the addition, the catalyst complex particles had become so large as a result of agglomeration that accurate sampling was impossible.

(D) Treatment with Diethylphosphite

The remaining 310 ml of suspension from (A) was combined with 500 ml hexane and the result was stirred briefly. Solids were allowed to settle and 490 ml supernatant were replaced by 260 ml hexane. To the result were added 50 ml of a solution made by dissolving 13.1 ml diethylphosphate in sufficient hexane to give a total volume of 100 ml. After stirring the resulting mixture, a 1.8 ml sample was removed, diluted with 50 ml hexane, and samples of the result, identified as IIID, were used according to (E).

(E)

Ethylene polymerizations were carried out with III (A), (B) and (D) according to the procedure of Example I(E). Results are reported in Table 4.

TABLE 4

| RUN NO. | 1 | 2 | 3 | 4 | 5 | 6 | 7 |
|---|---|---|---|---|---|---|---|
| CATALYST COMPLEX | IIIA | IIIB | IIID | IIID | IIIA | IIIB | IIID |
| AMOUNT (mg) | 1.05 | 0.83 | 0.93 | 1.11 | 1.5 | 1.1 | 1.21 |
| P/Al | 0 | 0.97 | 0.98 | 0.98 | 0 | 0.97 | 0.98 |
| $H_2$ (psig) | 45 | 45 | 45 | 45 | 50 | 50 | 50 |
| YIELD (g) | 53.4 | 23.2 | 41.2 | 50.3 | 44.9 | 51.3 | 58.6 |
| ACTIVITY (kg/g/hr) | 51 | 28 | 44 | 45 | 31 | 47 | 48 |
| MI (dg/min) | 0.6 | 0.6 | 0.4 | 0.6 | 0.9 | 0.7 | 0.4 |
| $MF_{10}$/MI | 37 | 36 | 33 | 33 | 32 | 35 | 34 |
| WT. % RETAINED ON SIEVE (μ) | | | | | | | |
| 850 | 29 | 36 | 40 | 24 | 22 | 29 | 31 |
| 425 | 24 | 37 | 33 | 26 | 24 | 26 | 24 |
| 250 | 25 | 18 | 17 | 22 | 26 | 21 | 20 |
| 150 | 9 | 3 | 5 | 13 | 11 | 11 | 10 |
| PAN | 12 | 6 | 6 | 15 | 17 | 12 | 16 |
| APS (μ) | 470 | 660 | 700 | 430 | 400 | 480 | 485 |
| BD (g/cm$^3$) | 0.33 | 0.32 | 0.29 | 0.32 | 0.32 | 0.31 | 0.31 |

From the tables, it can be seen that triethylphosphate and diethylphosphite improved polymer morphology slightly without substantial effects on other properties.

EXAMPLE IV

(A) Control Catalyst Complex

To a 2 liter flask equipped as in I(A) were added several ml of a liquid, hydrocarbon-soluble TBT-ME reaction product containing 0.60 g-atoms magnesium and 0.24 g-atom titanium followed by 800 ml hexane and then 385 ml 3.37 M EADC in hexane over 2⅔ hours with stirring. A precipitate formed during the addition. After allowing the result to sit overnight, 555 ml EADC solution were added with stirring over 1½ hours after which stirring was continued for 1½ hours. Solids were allowed to settle and then 1.27 liters of clear supernatant were removed and replaced with 1.4 liters of hexane. A 1.1 ml sample was removed, diluted with 50 ml hexane, and samples of the result, identified as IVA, were used according to (E).

(B) Treatment with Phosphate Ester Mixture 136 ml of the suspension remaining after removal of the 1.1 ml sample in (A) were syringed into a 300 ml flask equipped as in I(A) and 60 ml hexane were added. To the result were added about 5.5 ml (6.7 g) Pfaltz and Bauer D24340, which is identified as a mixture of mono- and diethylphosphates (MDEP), with stirring over 20 minutes. Stirring was continued an additional 40 minutes after which a 1.5 ml sample was taken and diluted with 50 ml hexane. Samples of the result, identified as IVB, were used in (E).

(C) Treatment with Phosphate Ester Mixture

To the suspension remaining after sampling in (B) were added 4.5 ml of MDEP with stirring over 10 minutes. After an additional 20 minutes of stirring, 1.3 ml of the result were removed and diluted with 50 ml hexane. Samples of the result, identified as IVC, were used in (E).

(D) Treatment with Diethyl Ethylphosphonate

To a 500 ml flask equipped as in I(A) were added 160 ml of suspension from (A) and 200 ml hexane. To the result were added 6.6 g diethyl ethylphosphonate (DEPP) with stirring. A 2.1 ml sample of the result was removed and diluted with 50 ml hexane. Samples of the result, identified as IVD, were used in (E).

(E)

Polymerization of ethylene was carried out using samples of IV A-D in accordance with I(E). Results are reported in Table 5.

TABLE 5

| RUN NO. | 1 | 2 | 3 | 4 | 5 | 6 | 7 | 8 | 9 | 10 |
|---|---|---|---|---|---|---|---|---|---|---|
| CATALYST COMPLEX | IVA | IVA | IVB | IVC | IVD | IVD | IVB | IVC | IVC | IVB |
| AMOUNT (mg) | 3.3 | 3.4 | 1.0 | 4.4 | 6.0 | 10.8 | 1.9 | 1.7 | 4.4 | 2.1 |
| P/Al | 0 | 0 | ~0.9 | ~1.4 | 0.33 | 0.33 | ~0.9 | ~1.4 | ~1.4 | ~0.9 |
| $H_2$ (psig) | 55 | 60 | 60 | 60 | 50 | 50 | 70 | 65 | 85 | 100 |
| YIELD (g) | 59.4 | 46.5 | 33.1 | 29.7 | 44.5 | 70.1 | 45.4 | 20.3 | 59.6 | 36.1 |
| ACTIVITY (kg/g/hr) | 18 | 14 | 33 | 7 | 7.4 | 6.5 | 24 | 12 | 14 | 17 |
| MI (dg/min) | 0.7 | 1.4 | 0.6 | 0.8 | 0.8 | 1.1 | 1.4 | 0.6 | 9.0 | 6.2 |
| FINES (wt. %)[1] | 11 | 13 | 3 | 15 | 5 | * | 7 | 11 | 14 | 10 |
| APS (μ) | 320 | 295 | 400 | 245 | 490 | * | 390 | 330 | 300 | 320 |
| BD (g/cm$^3$) | 0.31 | 0.32 | 0.23 | 0.19 | 0.27 | * | 0.24 | 0.21 | 0.23 | 0.25 |

[1]FINES represents the PAN fraction of the total product, i.e., smaller than 150μ.
*These values were not determined.

EXAMPLE V (A) Control Catalyst Complex

To a 2 liter flask equipped as in Example I(A) were added 199.2 g (1.21 mole) ME, 237 ml (0.49 mole) TBT, 150 ml nonane and sufficient hexane to bring the total volume to 1.52 l. The result was heated at 150° C. until the ME dissolved and then allowed to cool. A 53 ml sample of the result was transferred to a 300 ml flask equipped as in I(A) and 86 ml hexane were added. The solution then was stirred at 250 rpm and dropwise addition of 92 ml 3.37 M EADC in hexane was begun. The addition was completed in about an hour, during which time a precipitate formed. Stirring was continued for an additional 35 minutes. Subsequently a 1.3 ml sample was taken and diluted with 50 ml hexane. The result, identified as VA, was used in polymerization according to (D).

(B) Treatment with Diethylphosphate

One day after removal of the 1.3 ml sample in (A), 143 ml clear supernatant were removed from the remaining suspension and 180 ml hexane were added. The result then was stirred briefly at 250 rpm after which solids were allowed to settle, 170 ml supernatant were removed and 160 ml hexane were added. The result was stirred again, solids were allowed to settle and 75 ml supernatant were removed. 5.4 g diethylphosphate (DEP) then were added over 23 minutes, with stirring, after which a 1 ml sample of the resulting suspension of treated complex was removed and diluted with 50 ml hexane. Samples of the result, identified as VB, were employed in (D).

(C) Treatment with Diethylphosphate

To the supsension remaining after removal of the sample in (B) were added 5 g DEP with stirring over 20 minutes. A 1 ml sample of the result was removed and diluted with 50 ml hexane. Samples of the result, identified as VC, were employed in (D).

(D) A series of ethylene polymerizations was conducted using samples of VA, VB and VC according to the procedure of Example I(E) except as otherwise noted. Results are reported in Table 6.

TABLE 6

| RUN NO. | 1 | 2 | 3 | 4 | 5 | 6 | 7 |
|---|---|---|---|---|---|---|---|
| CATALYST COMPLEX | VA | VB | VC | VB | VC | VB | VA |
| AMOUNT (mg) | 0.84 | 0.80 | 0.80 | 0.70 | 2.0 | 1.5 | 1.6 |
| DEP/Al | 0 | 1.1 | 2.1 | 1.1 | 2.1 | 1.1 | 0 |
| $H_2$ (psig) | 45 | 45 | 45 | 55 | 65 | 80 | 80 |
| YIELD (g) | 52.3 | 66.8 | 41.1 | 45.4 | 53.2 | 56.1 | 60.3 |
| ACTIVITY (kg/g/hr) | 62 | 83 | 51 | 65 | 22 | 37 | 38 |
| MI (dg/min) | 0.7 | 0.5 | 0.3 | 0.8 | 1.3 | 5.2 | 6.0 |
| $MF_{10}$/MI | 30 | 27 | * | * | 30 | * | * |
| WT. % RETAINED ON SIEVE (μ) | | | | | | | |
| 850 | 17 | 10 | * | 8 | 45 | * | 6 |
| 425 | 26 | 26 | * | 27 | 42 | * | 22 |
| 250 | 21 | 25 | * | 28 | 10 | * | 28 |
| 180 | 6 | 7 | * | 7 | 1.2 | * | 7 |
| 150 | 7 | 7 | * | 6 | 0.5 | * | 7 |
| PAN | 24 | 24 | * | 23 | 0.7 | * | 31 |
| APS (μ) | 350 | 320 | * | 330 | 790 | * | 280 |
| BD (g/cm$^3$) | 0.24 | 0.25 | * | 0.23 | * | * | 0.24 |

*These values were not determined.

EXAMPLE VI

Various control catalyst complexes prepared from ME, TBT and EADC generally in accordance with the procedure of the previous examples were treated with various amounts of phosphorus compounds and used in ethylene polymerizations. Details and polymerization results are reported in Tables 7 and 8.

TABLE 7

| RUN NO. | PHOSPHORUS COMPOUND | P/Al | AMOUNT (mg) | $H_2$ (psig) |
|---|---|---|---|---|
| 1 | None | 0 | 0.79 | 50 |
| 2 | $POCl_3$ | 1.76 | 0.78 | 50 |
| 3 | None | 0 | 1.36 | 85 |
| 4 | $POCl_3$ | 1.76 | 1.17 | 90 |
| 5[1] | None | 0 | 1.05 | 45 |
| 6 | $OPCl(OC_2H_5)_2$ | 1.44 | 2.2 | 45 |
| 7 | $OPCl(OC_2H_5)_2$ | 1.44 | 1.4 | 45 |
| 8 | $OPCl(OC_2H_5)_2$ | 2.0 | 2.0 | 40 |
| 9 | None | 0 | 1.5 | 50 |
| 10 | $OPCl(OC_2H_5)_2$ | 1.44 | 2.5 | 75 |
| 11 | $OPCl(OC_2H_5)_2$ | 2.0 | 3.0 | 60 |
| 12[1] | None | 0 | 1.04 | 45 |
| 13 | $OPCl_2(OC_2H_5)$ | 1.2 | 1.07 | 40 |
| 14 | $OPCl_2(OC_2H_5)$ | 1.2 | 0.80 | 40 |

TABLE 7-continued

| RUN NO. | PHOSPHORUS COMPOUND | $\frac{P}{Al}$ | AMOUNT (mg) | $H_2$ (psig) |
|---|---|---|---|---|
| 15 | $OPCl_2(OC_2H_5)$ | 1.9 | 0.82 | 40 |
| 16 | $OPCl_2(OC_2H_5)$ | 1.9 | 0.49 | 40 |
| 17[1] | None | 0 | 0.78 | 40 |
| 18 | $OP(OCH_2CHCH_2)_3$ | 1.24 | 1.04 | 40 |

[1]New control catalyst.

TABLE 8

| RUN NO. | YIELD (g) | ACTIVITY (kg/g/hr) | MI (dg/min) | $MF_{10}/MI$ | FINES (WT. %) | APS () |
|---|---|---|---|---|---|---|
| 1 | 57.9 | 73 | 1.1 | * | 17.9 | 340 |
| 2 | 57.9 | 74 | 1.1 | 31 | 13.6 | 430 |
| 3 | 47.5 | 35 | 7.1 | * | 23.4 | 300 |
| 4 | 40.1 | 34 | 6.3 | * | 18.6 | 305 |
| 5[1] | 53.4 | 51 | 0.6 | 37 | 12.1 | 470 |
| 6 | 47.2 | 21 | 0.6 | 40 | 6.9 | >850[2] |
| 7 | 65.5 | 47 | 0.9 | 34 | 6.0 | >850[2] |
| 8 | 41.4 | 21 | 0.7 | 34 | 12.8 | 570 |
| 9 | 44.9 | 31 | 0.9 | 32 | 16.6 | 380 |
| 10 | 56.1 | 22 | 3.0 | 37 | 7.9 | >850[2] |
| 11 | 43.1 | 14 | 2.5 | 44 | 14.2 | 480 |
| 12[1] | 41.5 | 40 | 0.9 | 45 | 8 | * |
| 13 | 53.5 | 50 | 0.9 | * | 1 | * |
| 14 | 57.1 | 71 | 1.1 | * | 2 | * |
| 15 | 64.4 | 79 | 0.8 | * | 1 | * |
| 16 | 67.5 | 137 | 0.7 | * | 3 | >850[2] |
| 17[1] | 54.1 | 69 | 0.9 | * | 15 | 425 |
| 18 | 56.7 | 54 | 0.5 | 35 | 8 | 635 |

* These values were not determined.
[1]New control catalyst.
[2]Greater than 50% of the product from these runs was retained on the 850μ screen.

We claim:

1. A catalyst composition comprising (A) an organometallic promoter and (B) a component prepared by contacting (1) a supported catalyst complex comprising an intimate association of at least one reduced Group IVB or VB metal halide, at least one divalent metal halide and at least one compound of aluminum with (2) at least one oxygenated compound of phosphorus having at least one oxygen atom double-bonded to phosphorus in an amount and under conditions effective to improve polymer morphology.

2. The catalyst composition of claim 1 wherein the oxygenated compound of phosphorus is selected from the group consisting of the oxyacids, oxyhalides, organic and/or oxygenated organic derivatives of the oxyhalides, phosphorus acid esters, halogen-substituted derivatives of the esters, condensed oxygenated compounds containing recurring P-O units and mixtures thereof.

3. The catalyst composition of claim 2 wherein the solid complex comprises an intimate association of reduced titanium chlorides, magnesium chloride and at least one aluminum compound wherein titanium content ranges from about 6 to about 20 wt.%, magnesium content ranges from about 7 to about 25 wt.%, aluminum content ranges from about 2 to about 15 wt.% and chlorine content ranges from about 50 to about 70 wt.%.

4. The catalyst composition of claim 3 wherein the oxygenated compound of phosphorus is at least one $C_{1-8}$ alkyl or aryl derivative of phosphorus oxytrichloride or $C_{1-8}$ alkyl or aryl phosphate, phosphonate or phosphite.

5. A catalyst composition comprising an organometallic promoter and a component prepared by contacting (A) a reaction product of components comprising (1) at least one higher valent Group IVB or VB metal compound, (2) a support material comprising at least one catalytically inert divalent metal compound and (3) at least one organoaluminum compound corresponding to the formula $AlR_nX_{3-n}$, wherein R is hydrocarbyl, X is halogen, and $0 < n \leq 3$, with (B) at least one oxygenated compound of phosphorus having at least one oxygen atom double-bonded to phosphorus in an amount and under conditions effective to improve polymer morphology.

6. The catalyst composition of claim 5 wherein (B) is at least one oxyacid of phosphorus, oxyhalide of phosphorus, organic and/or oxygenated organic derivative of a phosphorus oxyhalide, phosphorus acid ester, halogen-substituted derivative of a phosphorus acid ester, or condensed oxygenated compound containing recurring P-O units.

7. The catalyst of claim 6 wherein (A) (2) comprises at least one magnesium compound selected from the group consisting of the chloride, oxide, alkoxide and dialkyl phosphates containing 1 to about 6 carbon atoms per alkoxy or alkyl group.

8. The catalyst composition of claim 7 wherein (A) (1) is a titanium(IV) chloride, alkoxide or alkoxychloride containing 1 to about 8 carbons per alkoxy group or a combination of said titanium (IV) compound with at least one zirconium(IV) or vanadium(III), (IV) or (V) chloride, alkoxide, alkoxychloride, oxychloride, oxyalkoxide or oxyalkoxychloride containing 1 to about 8 carbons per alkoxy group.

9. The catalyst composition of claim 8 wherein (A) (3) comprises at least one compound corresponding to the formula $AlR_nX_{3-n}$, wherein R is alkyl of 1 to about 6 carbons, X is chlorine and $0 < n \leq 3$.

10. The catalyst composition of claim 9 wherein (B) is at least one $C_{1-8}$ alkyl or aryl derivative of phosphorus oxytrichloride or $C_{1-8}$ alkyl or aryl phosphate, phosphonate or phosphite.

11. The catalyst composition of claim 10 wherein (A) (1) comprises $TiCl_4$, $Ti(OC_4H_9)_4$ or a mixture thereof, (A)(2) comprises $Mg(OC_2H_5)_2$ and (A) (3) comprises $Al(C_2H_5)_2Cl$, $Al(C_2H_5)Cl_2$ or a mixture thereof.

* * * * *